Patented Feb. 28, 1933

1,899,701

UNITED STATES PATENT OFFICE

ROBERT H. LEACH, OF FAIRFIELD, CONNECTICUT, ASSIGNOR TO HANDY & HARMAN, OF NEW YORK, N. Y., A CORPORATION OF NEW YORK

ALLOY

No Drawing.  Application filed July 12, 1932. Serial No. 622,108.

This invention relates to alloys and is concerned more particularly with a novel alloy which is especially useful for brazing purposes. The new alloy flows freely at relatively low temperatures so that it can be employed without probability of damage to the objects to be united and it has excellent physical properties, which enable it to produce strong joints. Also, it has a wide range of utility and may be employed for brazing iron, steel, and a large number of non-ferrous metals and alloys.

The new alloy contains a relatively large proportion of silver, and lesser amounts of copper, zinc, and cadmium, the range of these ingredients being substantially as follows:

|  | Per cent |
| --- | --- |
| Silver | 48 to 52 |
| Copper | 12 to 16 |
| Zinc | 14 to 18 |
| Cadmium | 16 to 20 |

A specific formula for an alloy of the new type which is desirable for the purposes mentioned is given in the following example:

|  | Per cent |
| --- | --- |
| Silver | 50 |
| Copper | 15.5 |
| Zinc | 16.5 |
| Cadmium | 18 |

An alloy within the range mentioned flows freely at about 1175° F. so that it can be widely used for brazing without liability of the objects to be joined being damaged. At the same time, the new alloy has physical properties which make it highly desirable for that purpose.

I am aware that silver alloys, known as "solders" and containing silver, zinc and copper are now in wide use, but, while it is possible to produce a solder containing those three ingredients which has a melting point comparable with that of the new alloy, such a ternary alloy of that melting point does not have satisfactory physical properties. Accordingly, when a silver-copper-zinc alloy is used for brazing, either the objects to be united must be subjected to a temperature which may do damage to them, or else to protect them against such temperatures, an alloy of undesirable physical characteristics must be used. With the new alloy, strong joints may be obtained without using detrimentally high temperatures.

The alloy of the composition mentioned will ordinarily be employed with a flux, but in those cases in which the use of a flux is not convenient, a slightly modified form of the new alloy may be employed which contains a small amount of phosphorus. The phosphorus used may amount to about 1% to 2%, and it may be substituted for an equivalent amount of silver, although approximately the same results are obtained when all the other ingredients are cut down from ¼% to ½% each and 1% to 2% of phosphorus is added.

What I claim is:

1. An alloy which consists of silver from about 48% to 52%, copper from about 12% to 16%, zinc from about 14% to 18%, and cadmium from about 16% to 20%.

2. An alloy which consists of about 50% silver, about 15.5% copper, about 16.5% zinc, and about 18% cadmium.

In testimony whereof I affix my signature.

ROBERT H. LEACH.